B. JONAS.
GALVANIC BATTERY.
APPLICATION FILED MAY 2, 1906.

913,824.

Patented Mar. 2, 1909.

WITNESSES:
D. C. Walter
Ada Law

INVENTOR.
Baroukh Jonas,
His Atty.

UNITED STATES PATENT OFFICE.

BAROUKH JONAS, OF TOLEDO, OHIO, ASSIGNOR, BY MESNE ASSIGNMENTS, TO THE JONAS BATTERY COMPANY, OF TOLEDO, OHIO, A CORPORATION OF OHIO.

GALVANIC BATTERY.

No. 913,824.    Specification of Letters Patent.    Patented March 2, 1909.

Application filed May 2, 1906. Serial No. 314,733.

*To all whom it may concern:*

Be it known that I, BAROUKH JONAS, a subject of the Sultan of Turkey, residing at Toledo, in the county of Lucas and State of Ohio, have invented certain new and useful Improvements in Galvanic Batteries; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to that class of galvanic cells in which the air serves as a depolarizer.

The objects of my invention are, first, to provide a galvanic cell with an iron electrode which shall be rust-proof; second, to increase the activity of the cell by a new arrangement of electrodes; third, to provide a galvanic cell with a novel combination of substances which insures increased activity of the cell with a minimum of polarization; fourth, to provide a simple and secure electric connection between the carbon electrodes hereinafter referred to and the positive terminal which may be easily removed and replaced, and fifth, to provide connections for the iron electrodes with their terminal which shall avoid the rusting of the iron plates hereinafter referred to. I attain these objects by means of the devices and arrangement of parts hereinafter described and shown, and illustrated in the accompanying drawings, in which—

Figure 1:
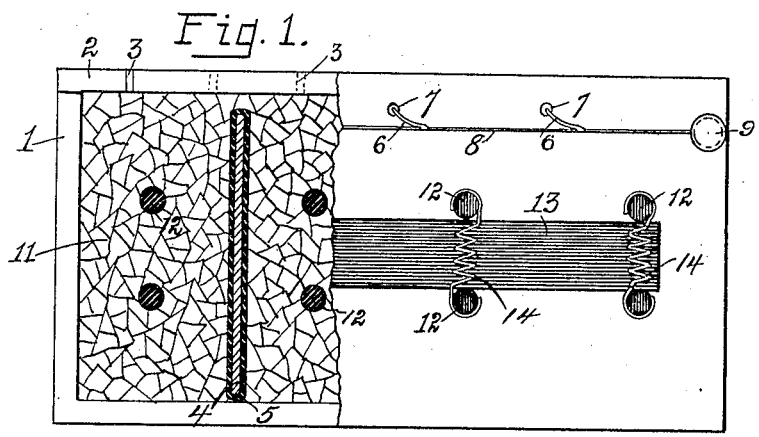
Figure 2:
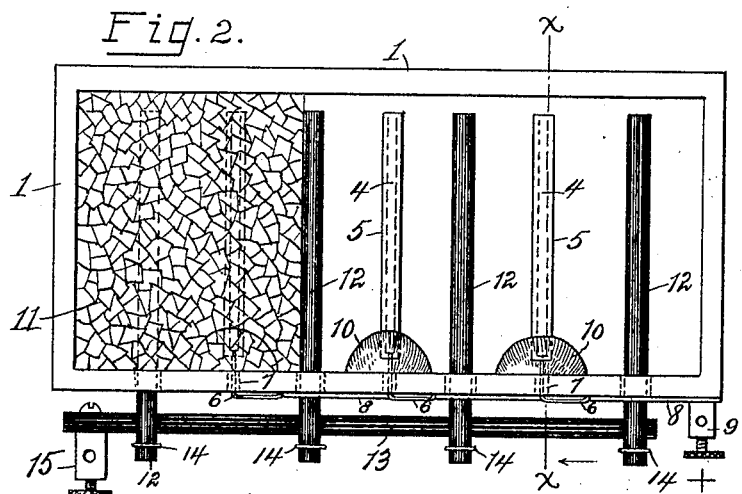
Figure 3:
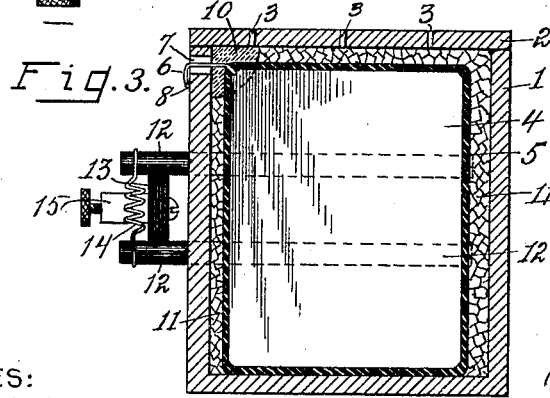

Figure 1 is a side elevation of my cell with a portion of the front wall broken away to show the interior arrangement; Fig. 2, a top-plan view of the same with the lid removed and with the granulated carbon element removed from one end of the box, and Fig. 3, a transverse sectional elevation taken on line x—x Fig. 2.

Like numerals of reference indicate like parts throughout the drawings.

In the drawings, 1 is the receptacle for the cell and is composed of wood, glass, stoneware, or other suitable material. Case 1 has a lid or cover 2 perforated, as at 3—3. Through these holes air has access to the contents of the case. Within the case are several iron plates 4 of nearly the area of the interior of the case in cross-section, vertically disposed and arranged at equi-distant intervals. Each of these plates is completely inclosed in a covering or envelop 5 of paper, asbestos, felt, cloth, or other porous absorbent fabric, which fabric is caused to closely adhere to the surface of the plate by means of paste, glue, or equivalent substances. This porous absorbent covering takes the place of and forms a cheap and efficient substitute for the porous jars or partitions heretofore employed in galvanic cells. It also prevents the iron from rusting, for the reason that the air cannot penetrate through the covering, especially when the covering is moist. The paste, glue, or the like, assists in the exclusion of the air. A tinned copper wire 6 is soldered to one of the upper corners of each of the plates 4 and leads through the covering 5, out through a small hole 7 in the front wall of the case 1. The wires 6 are connected to a single wire 8 leading to a binding post 9, forming one of the terminals of the battery. The upper corner of each of the iron plates to which the wires 6 are soldered is sealed with sealing-wax, bitumen, or other insulating moisture-proof substance, as at 10, thus insulating the wires 6 and forming seals which close the only spots through which air might penetrate to the iron plates. The spaces around and between the iron plates are filled with granulated carbon 11 with which finely comminuted sulfur is mixed. Some soft gelatinous, hygroscopic matter, such as clay or boiled starch may be added with advantage. The granulated carbon is also thoroughly mixed with and permeated by a small quantity of a strong solution of ferrous chlorid, or any other suitable iron salt, which has the property of keeping the granulated carbon damp for a very long time, for the reason that this iron salt attracts the moisture in the air and is highly deliquescent. This mixture is of such consistency as will permit the air to circulate through the mass. The filling of granulated carbon is traversed by two parallel rows of carbon rods 12 which alternate with the iron-plates 4 and extend through holes in the front wall of the receptacle 1. The projecting extensions of the rods are pressed against a central connecting plate or rod of carbon or metal 13 by means of springs 14 which insure close contact between the ends of the projecting rods and the rod or bar 13. The rod or bar 13 carries a binding post 15 which serves as the positive terminal of the cell.

The electrolytic process in my cell is as follows: The ferrous chlorid is decomposed into chlorin ions and iron ions. The former appear on the iron electrodes, combine with the iron, and form a new molecule of ferrous chlorid, thus replacing the one that has been decomposed. The iron ions are precipitated upon the granulated carbon and combine with the oxygen of the surrounding air so that polarization is prevented.

I am aware of the fact that sulfur has been used as a depolarizer in galvanic cells but I believe that the combination of sulfur and air in the presence of an iron salt is new. I find that this combination is a more efficient depolarizer than either sulfur or air alone. It would seem that sulfur and air in the presence of ferrous chlorid have a catalytic action upon each other so that the sulfur stimulates the action of the air upon the ferrous chlorid and the transformation of the latter into ferric chlorid.

Having described my invention, what I claim and desire to secure by Letters Patent is,—

1. In a galvanic cell, an electrode consisting of an iron plate, and an envelop for such plate composed of a porous absorbent fabric secured to the surface of the plate by a suitable adhesive.

2. In a galvanic cell, an electrode consisting of granulated carbon and carbon rods, said rods being disposed in two rows and projecting outside of the cell, a terminal common to and interposed between the projecting extremities of the rods, and means for holding said rods and said common terminal in close contact.

3. In a galvanic cell, an electrode consisting of granulated carbon and carbon rods, said rods being disposed in two rows and projecting outside of the cell, a terminal common to and interposed between the projecting extremities of the rods, and resilient means for holding said rods and said common terminal in close contact.

4. In a galvanic cell, an electrode consisting of a series of iron plates, porous absorbent envelops for said plates, a series of opposed carbon electrodes consisting in part of carbon rods alternated with said plates and projecting outside of the cell, a terminal common to said rods, means for securing said rods in contact with said terminal, and a deliquescent electrolyte disposed in the spaces between and around said electrodes.

5. In a galvanic cell, an electrode consisting of a series of iron plates, porous absorbent envelops for and adhering to said plates, a carbon electrode, consisting of granulated carbon and carbon rods, a terminal common to the iron plates, a terminal common to the carbon rods, and an electrolyte consisting of a deliquescent iron salt and permeating the envelops and the granulated carbon.

6. A galvanic cell, comprising a case, iron electrodes, carbon electrodes consisting of carbon in both solid and granulated form, a terminal common to the iron electrodes, a terminal common to the carbon electrodes, envelops for said iron electrodes consisting of porous absorbent fabric, an electrolyte consisting of ferrous chlorid, a water-proof seal for the point of attachment between the iron plates and their terminal, said granulated carbon and sulfur and ferrous chlorid being mixed in such proportions and consistency as to permit access of air which serves as a depolarizer.

In testimony whereof I affix my signature in presence of two witnesses.

BAROUKH JONAS.

Witnesses:
CLEM V. WAGNER,
ADA LAW.